March 11, 1969  R. B. HEMUS  3,432,010

SEALS FOR HYDRAULIC APPARATUS

Filed June 19, 1967

United States Patent Office 3,432,010
Patented Mar. 11, 1969

3,432,010
SEALS FOR HYDRAULIC APPARATUS
Robert B. Hemus, Birmingham, England, assignor to Girling Limited, Birmingham, England, a British company
Filed June 19, 1967, Ser. No. 646,889
Claims priority, application Great Britain, June 22, 1966, 27,819/66
U.S. Cl. 188—152                 7 Claims
Int. Cl. B60t 11/10; F16j 15/18, 15/50

ABSTRACT OF THE DISCLOSURE

The invention relates to a novel sealing boot for use in automobile disc brakes and includes a new method for fixing the boot to the brake actuating piston and the caliper body of the brake. The boot has radially spaced inner and outer peripheries of which the inner periphery fits over the piston end and the outer periphery is internally formed with a radial pocket. Within this pocket is seated a fixing ring which is provided with radial sprags, so that as the boot is passed over the cylinder housing the actuating piston, the sprags are resiliently sprung to grip the cylinder and to fix the ring between the cylinder and the boot. The inner periphery of the boot is engaged over the piston end and may be clamped on that end by a clamping ring shrunk around the boot either dielectrically or electromagnetically.

---

Figure 1:
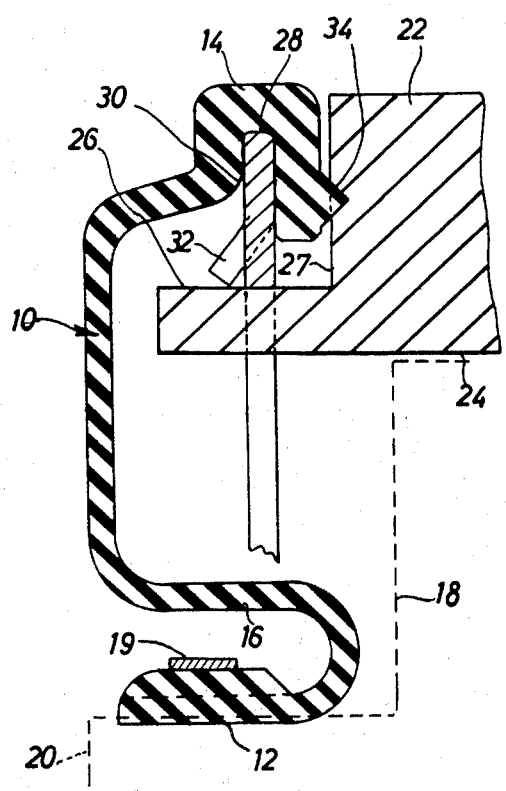

This invention concerns hydraulic apparatus such as hydraulically operated disc brakes for vehicles and relates more particularly to the protection of hydraulic pistons in such apparatus from contamination from foreign matter such as dirt and mud.

In hydraulic apparatus which is required to operate under dirty conditions and in which some or all of the hydraulic pistons in that apparatus are exposed to those conditions, it is usual to arrange a seal between each piston and the body of the apparatus in order to prevent foreign matter from entering the hydraulic cylinders containing the pistons and thereby impairing the operation of the latter. Commonly, such seals take the form of a so-called boot, which in effect is a sleeve having one end engaging the piston to be protected and its other end engaging the bore in the body of the apparatus leading to or forming a part of the relevant hydraulic cylinder. However, since the fit of the boot on the piston is frequently only an interference fit, it very quickly loses its sealing ability, whilst the conventional method of sealing the boot to the bore by providing the latter with an upstanding circumscribing flange over which the boot is fitted and to which it is secured by a ring which embraces the boot externally is not only expensive, but also results in the boot being gripped only at discrete points instead of uniformly.

The invention seeks to provide a boot which will avoid the foregoing disadvantages.

According to the broadest aspect of the present invention in a method of securing a boot between a hydraulic piston and a body member of hydraulic apparatus, a fixing ring is arranged internally of said boot, said body member is formed with an annular flange circumscribing the cylinder provided in said body member to receive said piston and said fixing ring is engaged over said flange to rest between said flange and said boot.

The engagement of the fixing ring on the flange may with advantage be resilient and may conveniently be achieved by providing the fixing ring with a plurality of radially inwardly directed resilient fingers adapted to slide over the flange and to yield slightly in an axial direction in so doing.

According to another feature, the present invention provides a generally annular boot for sealing a hydraulic piston relative to a body member in which it is received, said boot including an internal pocket formed at its outer periphery for housing a fixing ring for securing said periphery to said body member.

One convenient application of the invention is to the sealing of the actuating pistons in hydraulically operated disc brakes, such brakes usually including a so-called caliper straddling a brake rotor and providing a mounting for opposed friction elements which are moved into braking engagement with the rotor by one or more such pistons. In a disc brake of this nature, the end of the boot which seals on the actuating piston may engage the latter as an interference fit, but preferably it is clamped on the piston by a further ring having an initial diameter sufficient to pass over the piston and the boot end thereon, said further ring thereafter being compressed as by swaging or heat treatment to shrink it to tightly embrace the boot. For example, the clamping ring may be a plastic ring capable of being shrunk as by dielectric heating to cause it to grip the boot, or it may be an aluminium or other suitable metal ring which is shrunk on to the boot by an electro-magnetic forming operation.

In a modification of the invention, the aforementioned fixing ring which secures the boot to the caliper body may alternatively be an electro-magnetically formed ring, although this does require the provision of magnetic forming dies capable of being inserted inside the caliper in its assembled condition.

Figure 2:
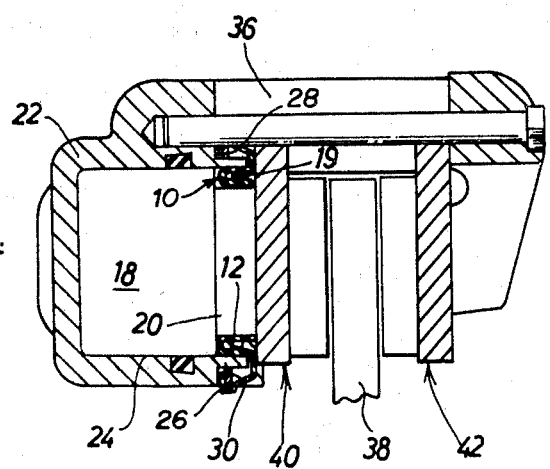

The invention will be described further, by way of example, with reference to the accompanying drawings, in which:

FIG. 1 is an axial section through a part of a boot for sealing an actuating piston relative to a caliper body in a disc brake, and FIG. 2 is a diagrammatic sectional elevation of a part of a disc brake employing the boot shown in FIG. 1.

The boot shown in FIG. 1 of the drawings, is of generally annular shape and includes an end wall 10 terminating at its inner periphery in an axially directed annular flange 12 and at its outer periphery in a thickened rim 14, the flange 12 being joined to the end wall 10 by a radially spaced and rolling flange 16 which permits relative axial movement between the flange 12 and end wall 10. The flange 12 is intended to engage over the reduced diameter end 20 of a hydraulic piston 18 (FIG. 2) displaceable in a cylinder 24 of a brake caliper member 22 and may, as shown, be an interference fit on said reduced diameter end, being for this purpose thickened relative to the flange 16. Preferably, however, the flange 12 has the same thickness as that of the flange 16 and is clamped to the reduced diameter end 20 of the piston 18 by an aluminium ring 19 which has an internal diameter initially commensurate with the external diameter of the flange 12 when fitted over the reduced diameter end 20 and which is subsequently subjected to an electromagnetic forming operation to reduce the said initial internal diameter and cause the ring uniformly to grip the whole of the circumference of the piston end 20. It will be appreciated that, by virtue of this latter feature, considerable latitude is available in the tolerances to which the piston end 20, the flange 12 and the aluminium ring need be dimensioned, since the ring automatically accommodates itself to the combined piston end and flange external diameter during the electromagnetic forming operation.

Around its internal periphery, the rim 14 of the boot is formed with a circumferential pocket 28 within which is received the outer diameter of a further ring 30. The mouth of the hydraulic cylinder 24 is circumscribed by an upstanding flange 26 and the ring 30 is provided intermediate its inner and outer peripheries with a plurality of radial fingers or sprags 32 turned slightly out of the plane of the remainder of the ring and capable of resiliently engaging the flange 26 for the purpose of securely anchoring the boot on the same. Although the sprags 32 are shown as lying outside the plane of the ring, it will be appreciated that they may equally well be formed to lie initially in the plane of the ring and may be deformed out of that plane only on assembly of the ring onto the flange 26.

The invention thus provides a boot having its inner and outer peripheries securely fixed respectively to the piston and to the caliper of the brake, and it will be noted that the axially inner end of the rim 14 of the boot is formed with a small lip or bead 34 which engages the shoulder 27 of the caliper adjacent the flange 26. This lip 34 is deformed when the fixing ring 30 is pressed into place on the flange 26 and thereby constitutes a face seal against the caliper body 22. Whilst the provision of the lip 34 is regarded as being necessary when the boot material is relatively thin, where a boot is made of somewhat thicker material, that material is itself usually sufficiently compressible to act as a face seal, and in such cases, the lip 34 is not necessary.

FIG. 2 shows the boot of the invention employed in a typical disc brake assembly. The body member or caliper 22 of the brake is formed with the hydraulic cylinder 24 housing the brake actuating piston 18 and has an axially extending portion 36 straddling a brake rotor 38. Friction pad assemblies 40 and 42 are carried by the caliper on opposite sides of the rotor 38 and the friction pad assembly 40 is directly actuated by the piston 18. The boot will be seen to close the end of the cylinder 24 from which the reduced diameter end 20 of the piston 18 extends to move the friction pad assembly 40.

In the assembly of the disc brake, the boot, already having its fixing ring 30 in the pocket 28, is engaged by its flange 12 over the reduced diameter end 20 of the piston and a loose aluminium or plastic clamping ring 19 is in turn placed over the exterior of the flange 12. This clamping ring is then shrunk by electromagnetic forming or by dielectric heating as appropriate so that it securely grips the boot and retains it on the piston. Where the caliper employs a pair of opposed pistons, both of which are hydraulically operated, the foregoing operations are repeated for the second piston and boot and then both pistons are inserted into their respective cylinders in the caliper halves and the two caliper halves are united together. At this stage, the brake is preferably tested hydraulically, a check for leakage being made by lifting each boot, and then the fixing rings 30 are pressed into place over the cooperating flanges 26 to complete the securing of the boot and the making of the face seals by the lips 34.

It will be appreciated that a number of modifications are possible within the scope of the invention and include the substitution of an electromagnetically or dielectrically formed ring for the spragged fixing ring 30 at the outer diameter of the boot, and also the use of either a formed ring or a spragged ring at one end only of the boot, leaving the other end thereof secured in conventional manner.

I claim:

1. A hydraulic piston and cylinder assembly comprising a portion of reduced external diameter at one end of the cylinder and constituting an axially directed flange circumscribing said cylinder end, an annular boot having a peripheral portion defining an internal annular pocket said boot being passed over said flange and engaged in sealing relation against said cylinder end, and an annular fixing ring seated in the pocket of the boot and having sprags on the internal periphery thereof cooperating with said flange to maintain the boot engaged thereon.

2. In a disc brake comprising a body member presenting portions situated on opposite sides of a brake rotor and providing a mounting for opposed friction elements movable into engagement with said brake rotor, said body member being formed with at least one hydraulic cylinder directed axially of said brake rotor, the improvement which comprises an axially directed flange on said body member and circumscribing the end of said cylinder remote from said rotor, a radial shoulder intermediate said flange and the remainder of said body member, an annular boot having a peripheral portion defining an internal annular pocket, said boot being passed over said flange and engaged in sealing relation against said shoulder and a fixing ring seated in said pocket of the boot and having sprags on the internal periphery thereof cooperating with said flange to maintain the boot engaged thereon.

3. A disc brake as set forth in claim 2 wherein the fixing ring is a plane, radially directed annular ring.

4. In a disc brake as set forth in claim 2 wherein said boot has a peripheral end face, and a rib member on said peripheral end face cooperating with said shoulder to constitute a face seal.

5. A disc brake as set forth in claim 2, wherein the inner periphery of the boot has an axial flange doubled back upon itself, the radially inner flange portion being thickened and seated on the piston, and wherein a clamping ring is clamped around said thickened portion to secure it to the piston.

6. A disc brake as set forth in claim 5, wherein the clamping ring is an initially oversize ring which is shrunk on to the boot by an electromagnetic forming operation.

7. A disc brake as set forth in claim 5, wherein the clamping ring is an initially oversize plastic ring which is shrunk on to the boot by dielectric heating.

References Cited

UNITED STATES PATENTS

| | | | |
|---|---|---|---|
| 2,239,908 | 4/1941 | Bauer et al. | 74—18.1 X |
| 2,283,139 | 5/1942 | Herget | 74—18.1 X |
| 2,739,829 | 3/1956 | Pedlow et al. | 29—447 X |
| 2,786,359 | 3/1957 | Karlan et al. | 74—18.1 |
| 2,910,933 | 11/1959 | Danly | 29—447 X |
| 2,976,907 | 3/1961 | Harvey et al. | |
| 3,017,511 | 1/1962 | Landsuerk et al. | |
| 3,264,885 | 8/1966 | Shellhause et al. | 74—18.2 |

FOREIGN PATENTS 1,211,875  3/1966  Germany.

GEORGE E. HALVOSA, Primary Examiner.

U.S. Cl. X.R.

74—18.2; 92—168